Sept. 26, 1944.  R. DALTON  2,358,794

OPTICAL SIGHTING INSTRUMENT

Filed Nov. 25, 1942  2 Sheets-Sheet 1

Inventor:
Richard Dalton,
by Harry E. Dunham
His Attorney.

Sept. 26, 1944. R. DALTON 2,358,794
OPTICAL SIGHTING INSTRUMENT
Filed Nov. 25, 1942    2 Sheets-Sheet 2
Fig.5.
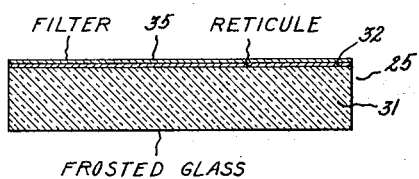
Fig.6.
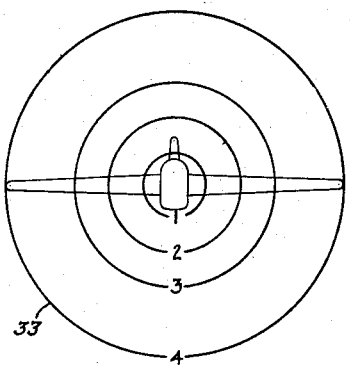
Fig.7.
| C I R C L E | TARGET SIZE IN FEET | | | | | | | | | |
|---|---|---|---|---|---|---|---|---|---|---|
| | 30 | 35 | 40 | 45 | 50 | 60 | 70 | 85 | 100 | 110 |
| 1 | 1000 | 1166 | 1332 | 1500 | 1665 | 2000 | 2331 | 2832 | 3325 | 3663 |
| 2 | 500 | 832 | 660 | 750 | 833 | 1000 | 1165 | 1415 | 1662 | 1832 |
| 3 | 330 | 389 | 444 | 500 | 555 | 666 | 777 | 943 | 1108 | 1221 |
| 4 | 200 | 233 | 266 | 300 | 333 | 400 | 466 | 566 | 665 | 733 |
| | RANGE IN YARDS | | | | | | | | | |
Fig.8.
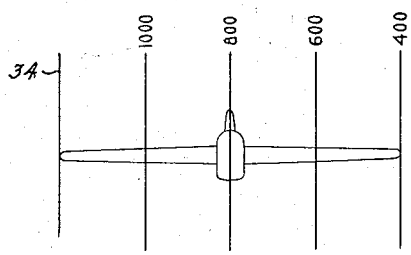
Inventor:
Richard Dalton,
by Harry E. Dunham
His Attorney.

Patented Sept. 26, 1944

2,358,794

UNITED STATES PATENT OFFICE 2,358,794

OPTICAL SIGHTING INSTRUMENT

Richard Dalton, Scotia, N. Y., assignor to General Electric Company, a corporation of New York Application November 25, 1942, Serial No. 466,838

2 Claims. (Cl. 88—2.3)

This invention relates to optical sighting instruments for determining the distance at which an object of known dimensions is situated by direct sighting; and it has for its general object the provision of a simple, inexpensive and yet accurate device of this character, and more specifically such a device which is a self-contained unit, portable and easily handled.

While it has more general application, this invention is particularly useful in determining the range of a target, and especially for determining the range of a target from aircraft.

In accordance with this invention, an incandescent lamp and a reflector therefor are mounted in one end of a casing member. A storage battery for the lamp is housed within the casing member for electrically supplying the lamp, and the casing member carries a switch for controlling the energization of the lamp. Thus far, the parts of the instrument are similar in construction and arrangement to an ordinary portable flash light. However, mounted over the reflector is a reticle provided with markings calibrated to a target of known size. Also, mounted on the casing member is a second casing member that supports a collimating lens which is located so that the reticle lies in its focal plane. Opposite the lens is a transparent reflecting member through which the target is viewed. Luminous images of the reticle markings appear at infinity in the field of view of the observer as he looks through the transparent reflecting member.

In one embodiment of the invention, the range can be read directly in the field of view, while in another a chart is provided from which the range can be read.

Figure 1:
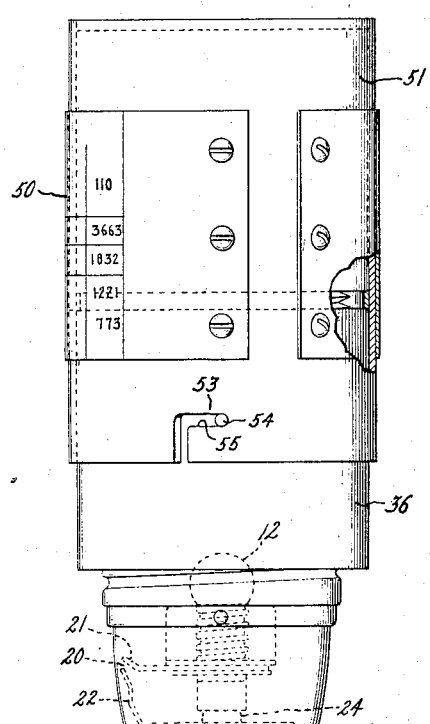
Figure 2:
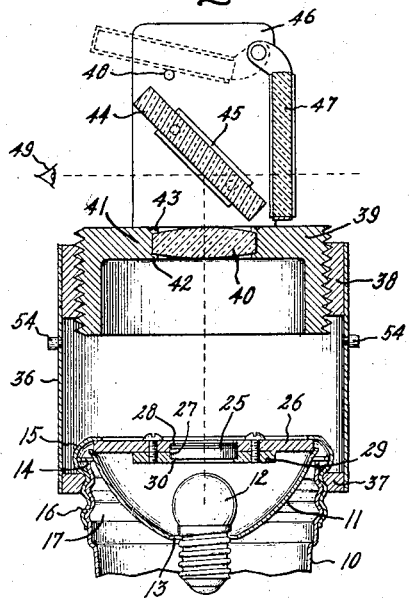
Figure 3:
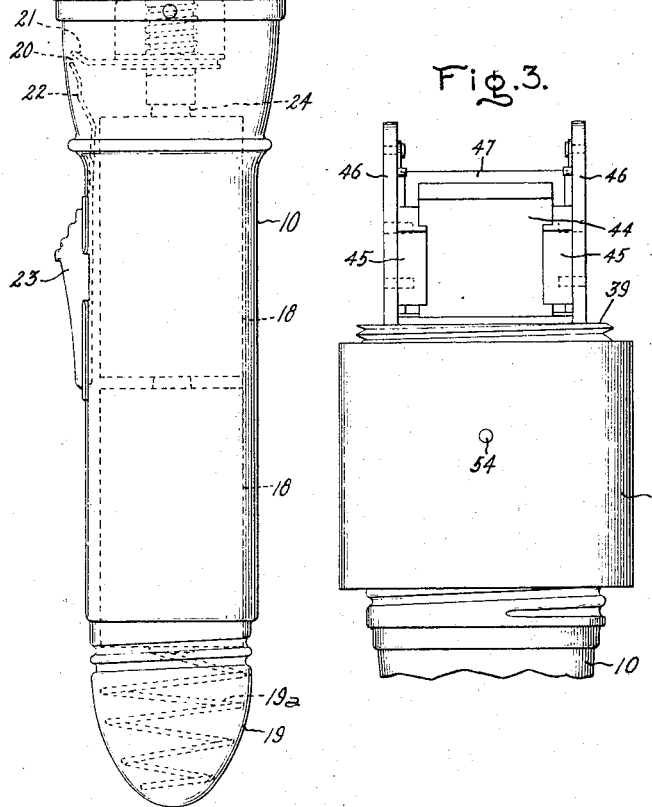
Figure 4:
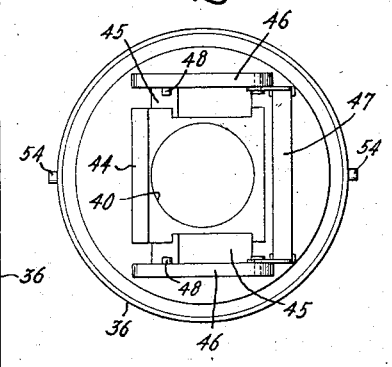

For a more complete understanding of this invention, reference should be had to the accompanying drawings in which Fig. 1 is a vertical elevation of an optical instrument embodying this invention; Fig. 2 is a fragmentary view in section of a part of the optical instrument of Fig. 1; Fig. 3 is a fragmentary elevation of a portion of the optical instrument shown in Fig. 1 with a portion removed so as to illustrate certain elements of the device; Fig. 4 is a top plan view of the part of the optical system shown in Fig. 3; Fig. 5 is a sectional view of a reticle used in the optical instrument of Figs. 1–4, the figure being drawn to a larger scale than Figs. 1–4; Fig. 6 is a diagrammatic representation illustrating the manner in which the reticle markings appear to the observer; Fig. 7 is a chart used in the optical instrument from which the range of targets of known size can be read directly; and Fig. 8 is a view similar to Fig. 6 but illustrating different reticle markings.

Referring to the drawings, this invention has been shown in one form as applied to a self-contained portable optical instrument for determining the range of a target. This instrument comprises an elongated cylindrical casing 10. Mounted in the upper end of this casing, as viewed in the drawings, is a suitable reflector 11 and mounted in the central axis of the reflector is a suitable incandescent lamp 12 which is threaded through a centrally arranged aperture 13 provided in the reflector, as clearly shown in Fig. 2. Surrounding the upper end of the reflector 11 is a spring 14 having a non-circular shape, such as a hexagonal shape, so that it engages the reflector at spaced points; housing the upper end of this spring and reflector is a suitable cap 15 which is also engaged by the spring at spaced points, whereby the reflector is clamped between the cap and the upper edge of the casing 10. The cap 15, as shown, is provided with a threaded section 16 which is threaded on a threaded section 17 on the upper edge of the casing. Mounted within the casing below the incandescent lamp 12 are a plurality of storage batteries 18 arranged in end-to-end relation and which are held in the casing by means of a spring 19a and cap 19 at the bottom, the cap being threaded on the lower end of the casing, as shown. The batteries function to electrically supply the lamp 12, and the energization of the lamp is controlled by means of a switch 20 having a fixed contact 21 and a movable contact 22 which is controlled by means of a button 23 shiftable longitudinally of the casing to open and close the switch. Thus far, the instrument is like an ordinary flash light. It will be understood that the upper terminal 24 of the upper battery is in contact with one terminal of the lamp 12, while the fixed switch contact 21 is in contact with the other terminal. It will be further understood that the movable contact 22 is electrically connected through the casing to the lower end of the lower battery 18 whereby when the switch 20 is closed, the lamp is energized and when it is opened the lamp is deenergized. The batteries, of course, are electrically insulated from the casing in the usual way.

Mounted in the mouth of the reflector over the incandescent lamp 12 is a reticle member 25. This member is mounted in an opaque supporting plate 26 which in turn seats in the reflector, as shown, and which is secured in its operative position with reference to the reflector by the cap 15. The plate 26 is provided with a centrally arranged aperture 27 in which the reticle member 25 is received, the plate having a shoulder 28 against which the reticle member rests and against which it is secured by means of a ring 29 mounted under the plate 26 and provided with a shoulder 30 for engaging and clamping the reticle member in position.

The reticle member 25 is shown in greater detail in Fig. 5. It consists in a transparent disk 31 the lower side of which is frosted. On the upper side is positioned a reticle 32 which is opaque, but which is provided with suitable transparent markings for passing light through it. The markings may be in the form of circles 33, as shown in Fig. 6, or in the form of parallel straight lines 34, as shown in Fig. 8. Positioned above the reflector is a suitable light filter 35.

Mounted upon the cap 15 is a second cylindrical casing 36 which at its lower end is provided with a collar 37 that is threaded on the outside of the cap 15. Mounted in the opposite end of the casing 36 is a second collar 38 in which is threaded a plug-like member 39. This member 39 functions to support a collimating lens 40. As shown, the member 39 has an inwardly extending flange 41 at its upper end which forms a central opening in which the lens is mounted; carried by the flange is a shoulder 42 upon which the lens 40 rests. The flange 41 also is provided with a spun-over section 43 above the lens for clamping it against the shoulder 42.

Also mounted upon the member 39 is a transparent reflecting member 44. As shown, the member 44 is mounted in clamps 45 at the sides which in turn are rigidly secured to upright standards 46 that are attached to the plug member 39. Also mounted upon the standards 46 is a light filter 47 which may be swung down into the line of sight of the transparent member 44, as shown in full lines in Fig. 2, or can be swung upwardly to its dotted line position shown in this figure out of the line of sight of the member 44. A suitable stop 48 is provided for holding the filter in its inoperative position.

It will be understood that in the operation of the instrument thus far described, the observer will hold it so as to bring the transparent sighting plate 44 in his line of vision. As shown in Fig. 2, the eye of the observer is indicated at 49, observing the target directly through the transparent member 44. The reticle 32 and the collimating lens 44 will produce a luminous virtual image of the reticle markings, which image will appear at an infinite distance to the eye of the observer in the target field of view, and more or less coincident with the target.

The reticle markings are calibrated to known target size so that when the markings frame a target of known size the range is at once determined.

In the case of the circular reticle markings 33 shown in Fig. 6, the circles are so calibrated that when a target of known size is framed by any one of them its range is known. However, in this case, the range is not read directly, and a suitable range chart 50 shown more fully in Fig. 7, is provided. This chart, as shown, reads in terms of circle size against target size. The circles are indicated "1," "2," "3" and "4" as they increase in size, and against these are plotted target sizes ranging from 30 to 110 feet, as shown. Opposite the circle numbers and under the various target sizes appear the ranges of the target in yards. In using the chart, if the target has a known size of 50 feet, for example, and is framed by circle "1," then from the chart, it will be known that its range is 1665 yards. If it is framed by circle "3," the chart will show that its range is 555 yards.

If the reticle having the parallel line marking shown in Fig. 8 is used, the range may be read directly. Here, however, the lines are calibrated to calculate the range of but one target of known size. When the target is framed between the left-hand line and the extreme right-hand line, as shown, its range will be 400 yards, and this will appear directly in the observer's field of view. If this target of known size is framed between the left-hand line and the next right-hand line its range will be 1000 yards.

Preferably, the upper end of the casing 36 will be enclosed by a suitable cylindrical cap 51 so as to protect the transparent sighting member 44 and the light filter 47 when the device is not being used. This cap slides over the upper end of casing 36 in telescopic relation with it, and it is detachably secured to it by means of a bayonet-type connection 53 comprising pins 54 and associated slots 55. When the chart 50 is used it is convenient to mount it upon the cap 51, as clearly shown in Fig. 1. The cap, of course, will be removed when it is desired to use the instrument.

It will be observed that I have provided a very simple, inexpensive and yet accurate optical instrument for determining range. It is self-contained and may thus be carried by the observer in his pocket until it is desired to use it; then the cap 51 will be removed and the range determined directly by viewing the target through the transparent member 44, the range being read directly from the reticle image when the reticle has the markings of Fig. 8, and being read from the chart 50 in case the reticle has the markings of Fig. 6.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A portable self-contained optical device comprising a casing, a reflector mounted in one end of said casing, an incandescent lamp mounted in said reflector, a storage battery in said casing for electrically supplying said lamp, a switch on said casing for controlling the energization of said lamp, a reticle mounted in the opening of said reflector, means detachably securing said reticle to said reflector, said reticle having a series of reference markings calibrated to different known target sizes, a second casing having one end detachably secured to said one end of said first casing, a collimated lens mounted in the other end of said second casing so that said reticle is located in its focal plane, and a transparent reflecting sighting member through which the target is observed supported on said other end of said second casing in the optical axis of said collimating lens.

2. An optical device for determining the range of a target comprising an elongated casing, a reflector in one end of said casing, a reticle having reference markings calibrated to a target of known size mounted in the reflector, a cap threaded on said one end of said casing for detachably securing said reticle and reflector in said end, an incandescent lamp mounted in said reflector, a storage battery for said lamp in said casing, a switch on said casing for controlling the energization of said lamp, a second casing in alignment with said first casing having one end attached to said cap, and an assembly mounted on the other end of said cap comprising a transparent reflecting member through which the target is viewed, and a collimating lens between said transparent member and said reticle positioned so that its focal plane coincides with said reticle, whereby the virtual image of said reference markings are produced in the observer's line of sight.

RICHARD DALTON.